US006990476B2

(12) United States Patent
Wen et al.

(10) Patent No.: US 6,990,476 B2
(45) Date of Patent: Jan. 24, 2006

(54) STORY INTERACTIVE GRAMMAR TEACHING SYSTEM AND METHOD

(75) Inventors: Sayling Wen, Taipei (TW); Zechary Chang, Taipei (TW); Ken Kung, Beijinh (CN)

(73) Assignee: Inventec Corporation, Taipei (TW)

( * ) Notice: Subject to any disclaimer, the term of this patent is extended or adjusted under 35 U.S.C. 154(b) by 774 days.

(21) Appl. No.: 10/003,226

(22) Filed: Dec. 6, 2001

(65) Prior Publication Data

US 2003/0110149 A1 Jun. 12, 2003

(51) Int. Cl.
*G06F 17/00* (2006.01)

(52) U.S. Cl. .......................................... 706/47; 706/12

(58) Field of Classification Search .................. 706/47, 706/12

See application file for complete search history.

(56) References Cited

U.S. PATENT DOCUMENTS 5,966,691 A * 10/1999 Kibre et al. ................ 704/260
6,728,679 B1 * 4/2004 Strubbe et al. .......... 704/270.1
6,735,592 B1 * 5/2004 Neumann et al. ........... 707/101
6,789,065 B2 * 9/2004 Berner et al. ............... 704/275
6,795,808 B1 * 9/2004 Strubbe et al. ............. 704/275
6,826,500 B2 * 11/2004 Linthicum et al. ............ 702/98

OTHER PUBLICATIONS

Vodislav et al, "Structured Interactive Animation for Multimedia Documents", IEEE Proceedings of International Symposium on Visual Languages, Sep.–Oct. 2000.*

* cited by examiner

*Primary Examiner*—George Davis
(74) *Attorney, Agent, or Firm*—Birch, Stewart, Kolasch & Birch, LLP

(57) ABSTRACT

A story interactive grammar teaching system and method. The disclosed system is a computer-aided grammar learning system. Grammar rules are embedded in the animations provided in the interactive grammar teaching system. The user can self test and enhance his or her language abilities with the help of the system. The disclosed method can achieve the goals of providing immediate practice tests, interacting with users, and guiding users through stories. The method includes the steps of: establishing an animation database and at least one animation file, receiving a command input from a user, and executing the command using the interactive grammar teaching system.

19 Claims, 9 Drawing Sheets

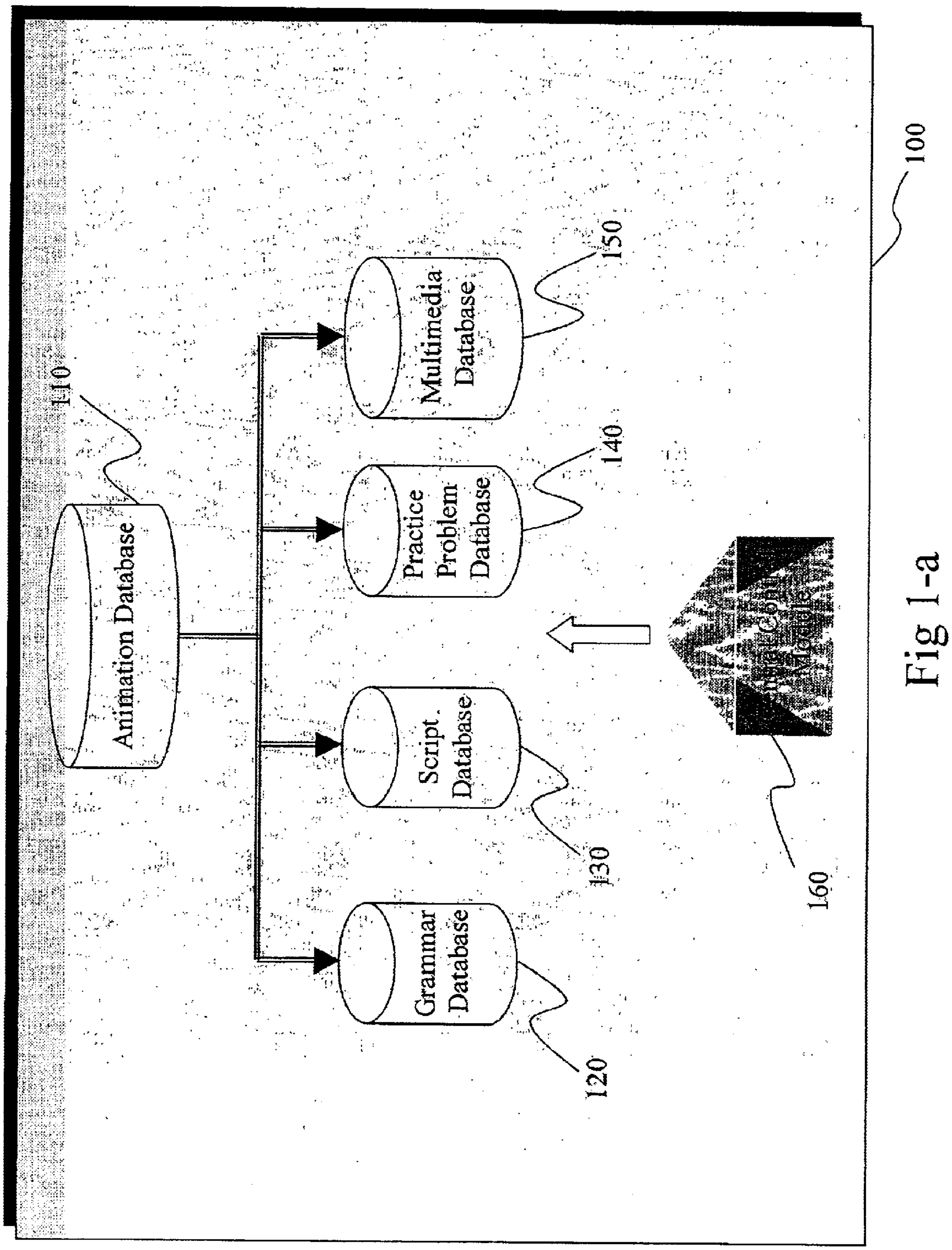
Fig 1-a

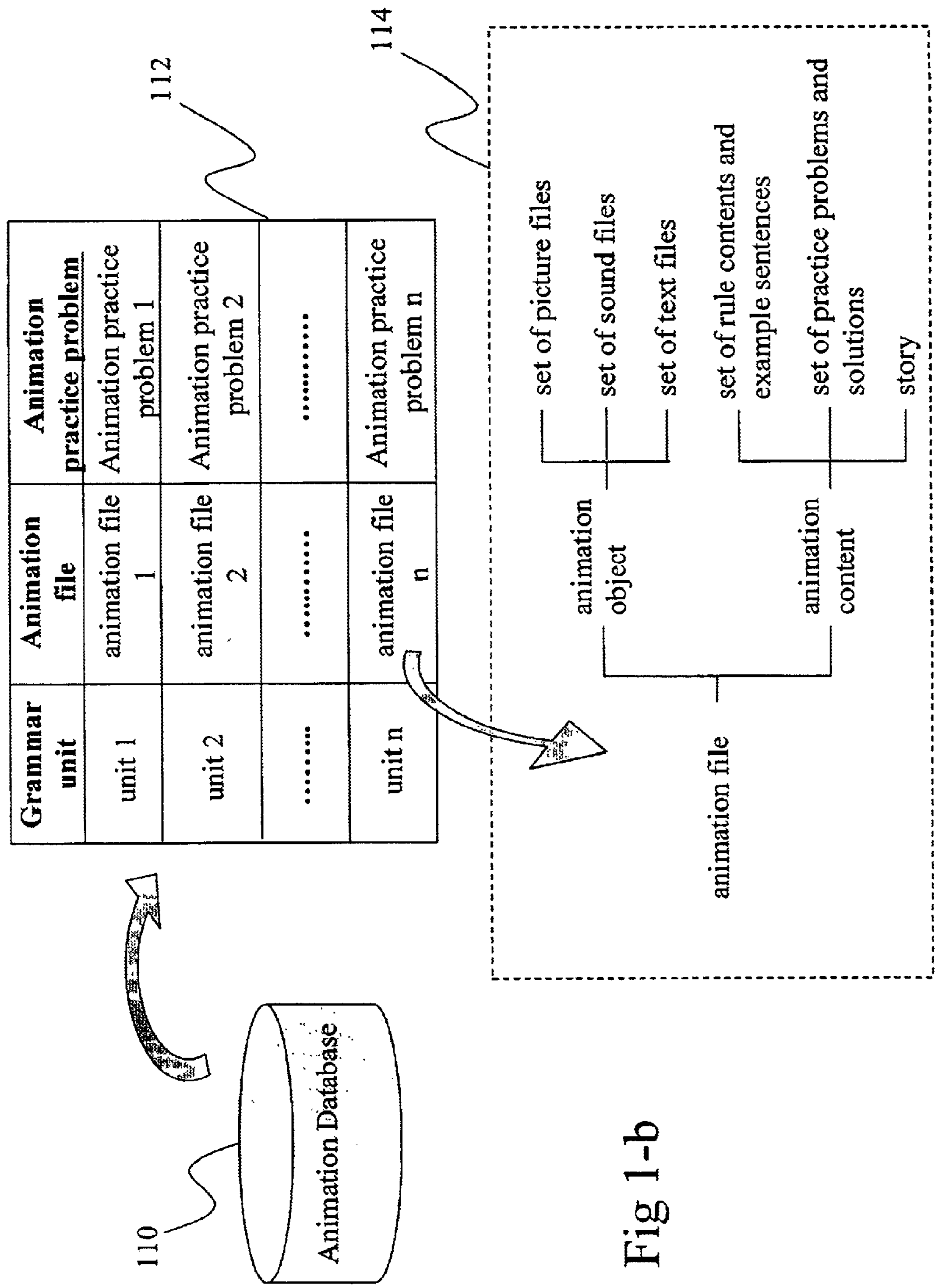
Fig 1-b

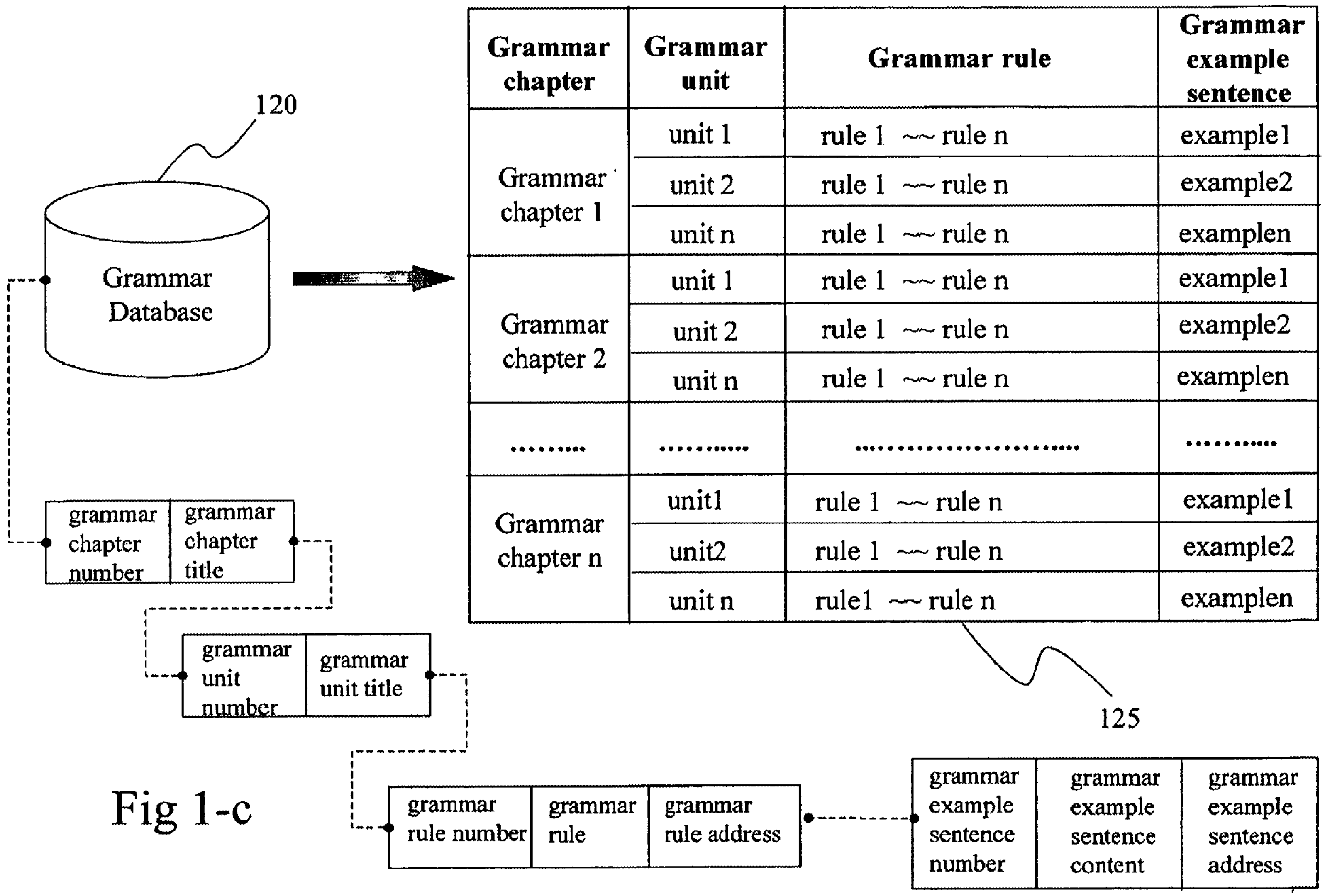
Fig 1-c

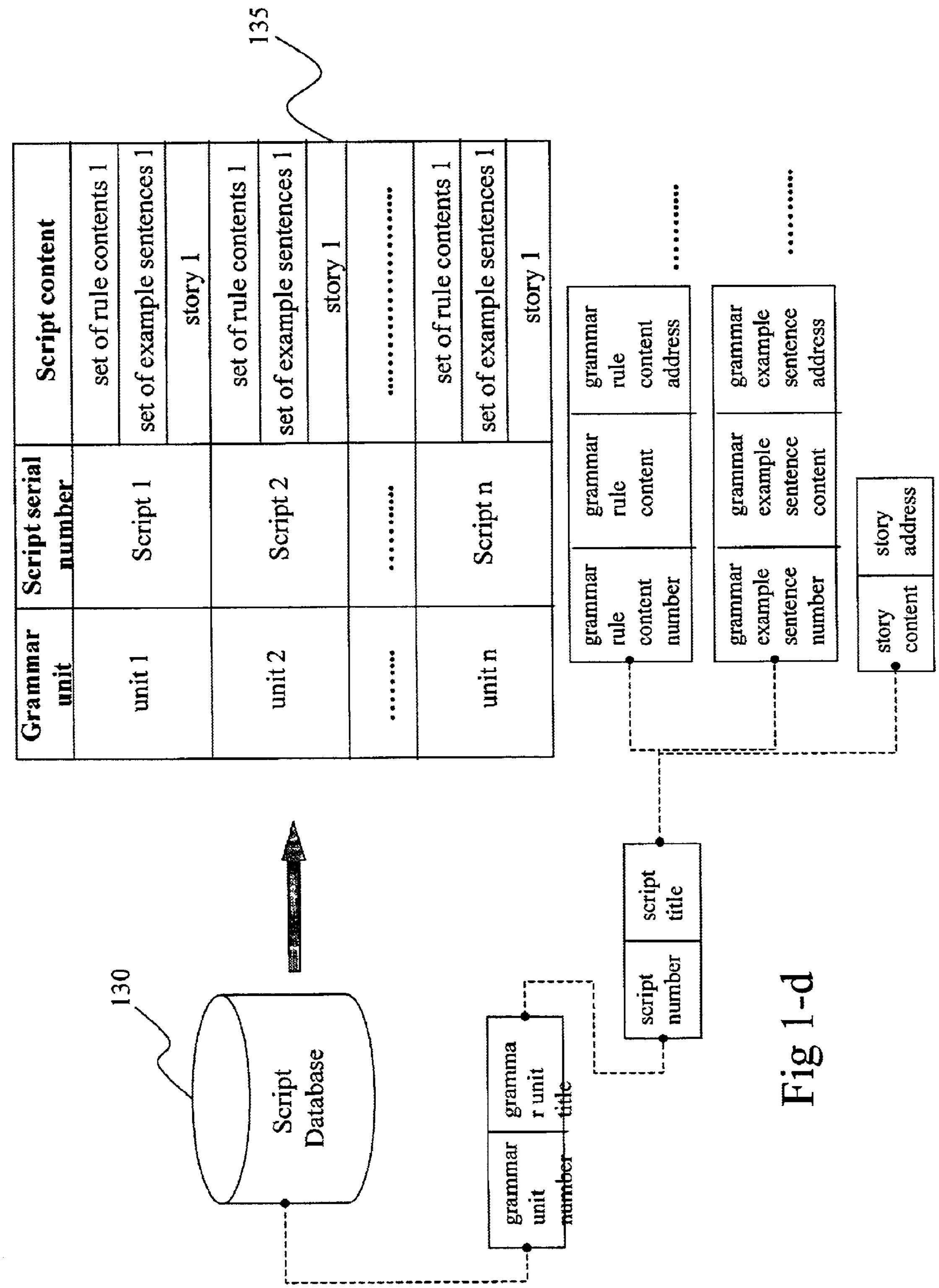
Fig 1-d

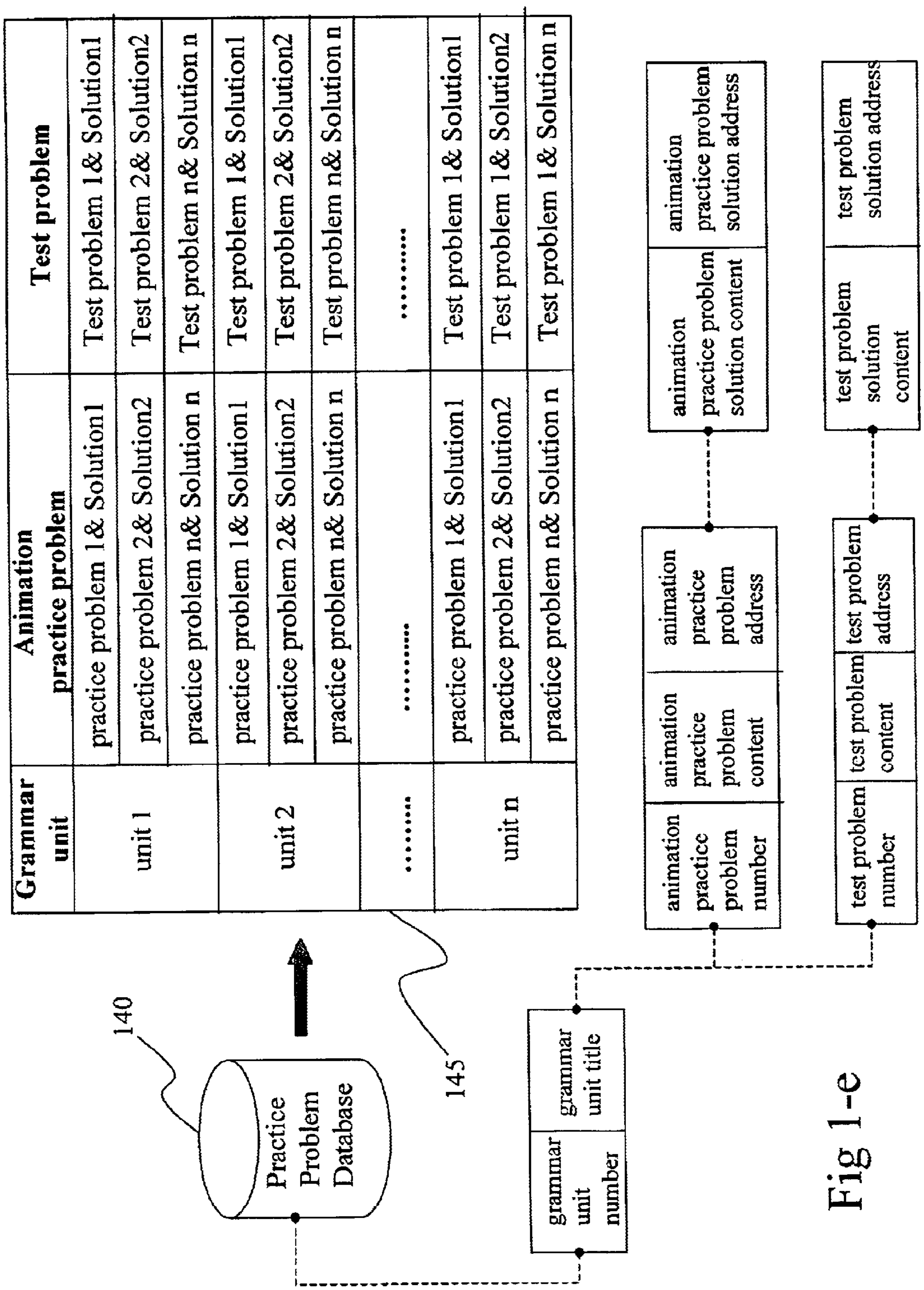
Fig 1-e

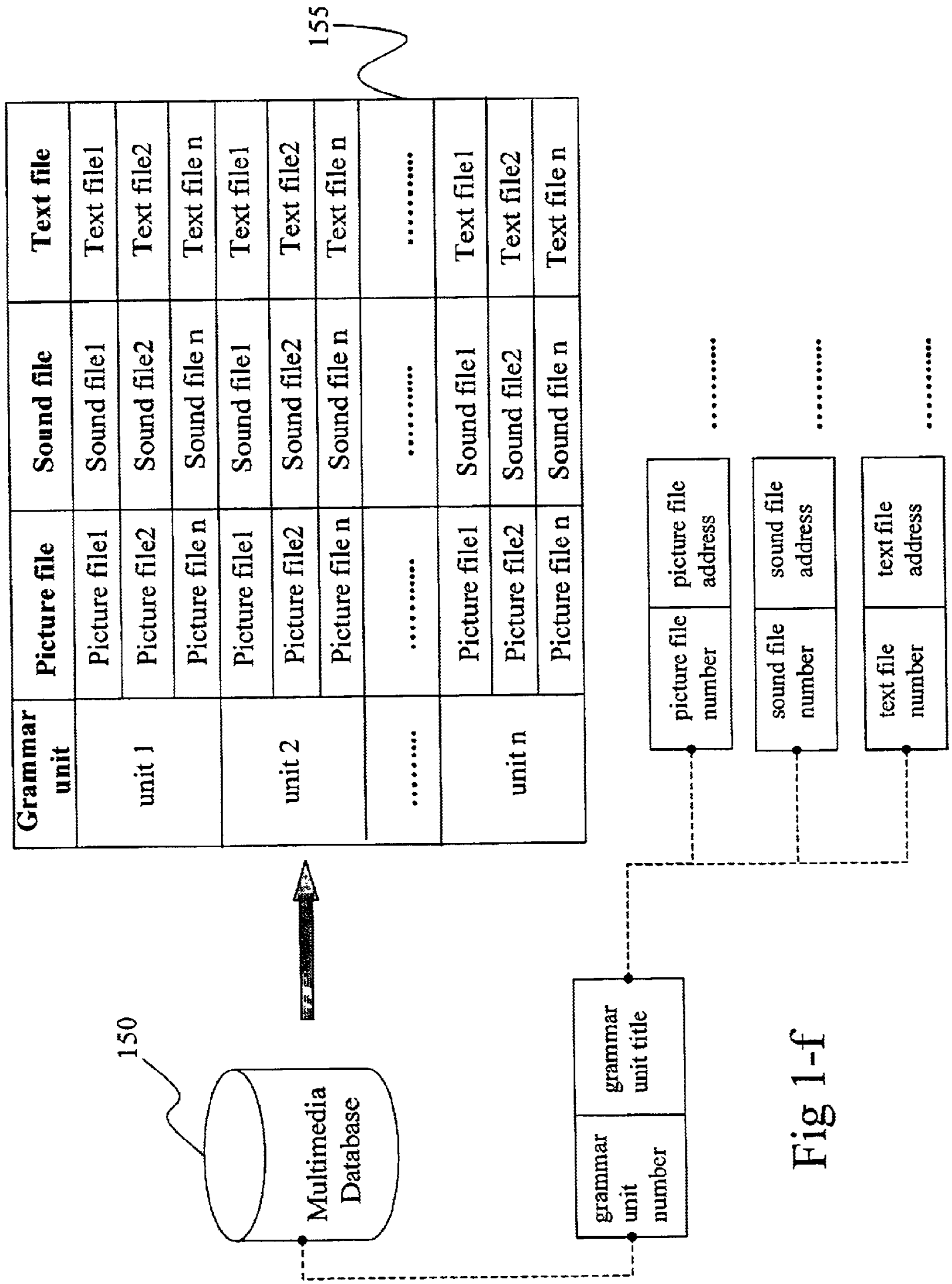
Fig 1-f

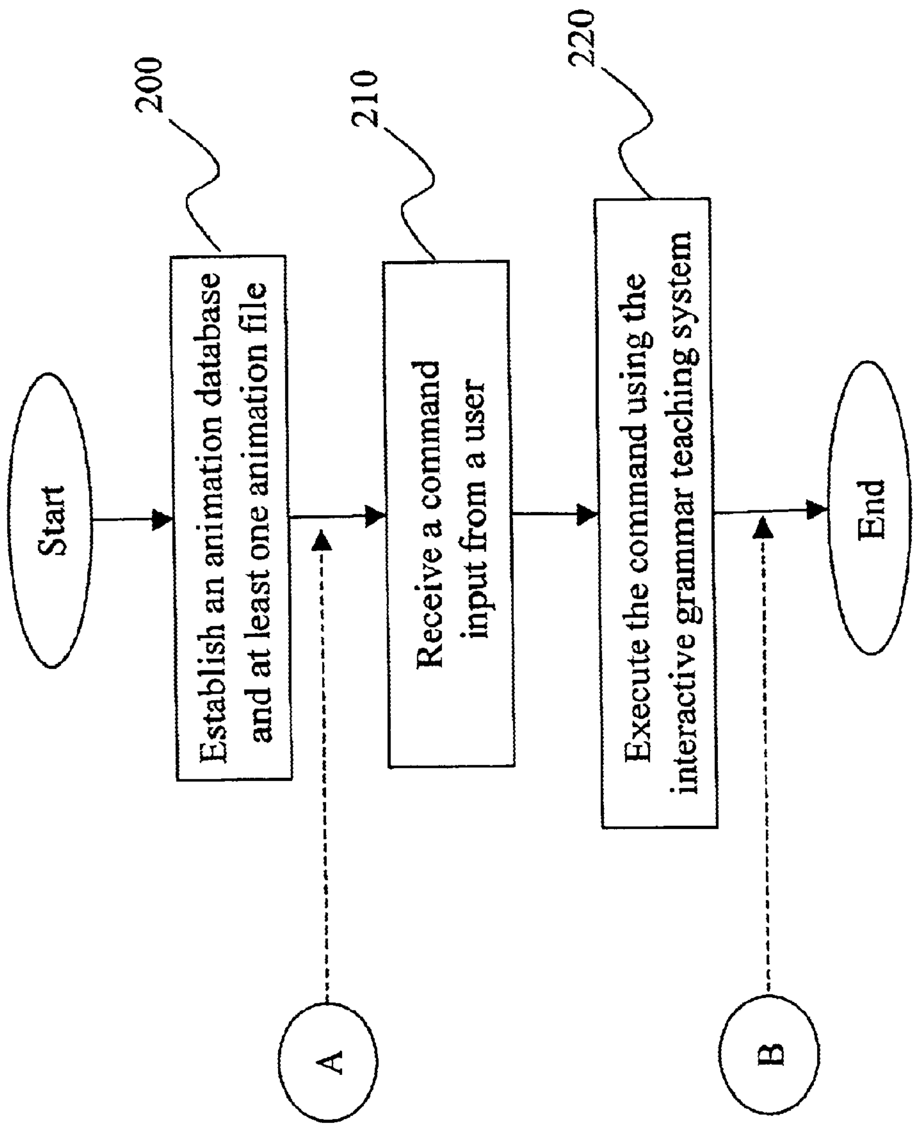
Fig 2-a

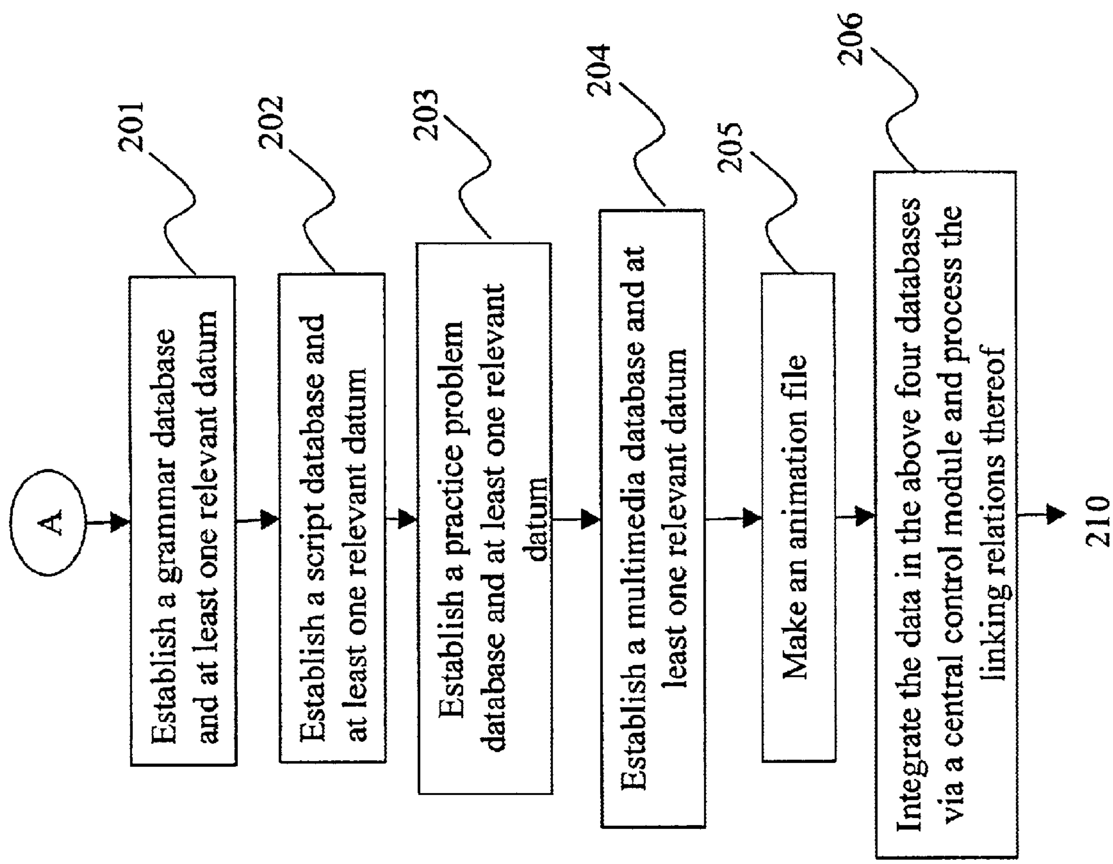
Fig 2-b

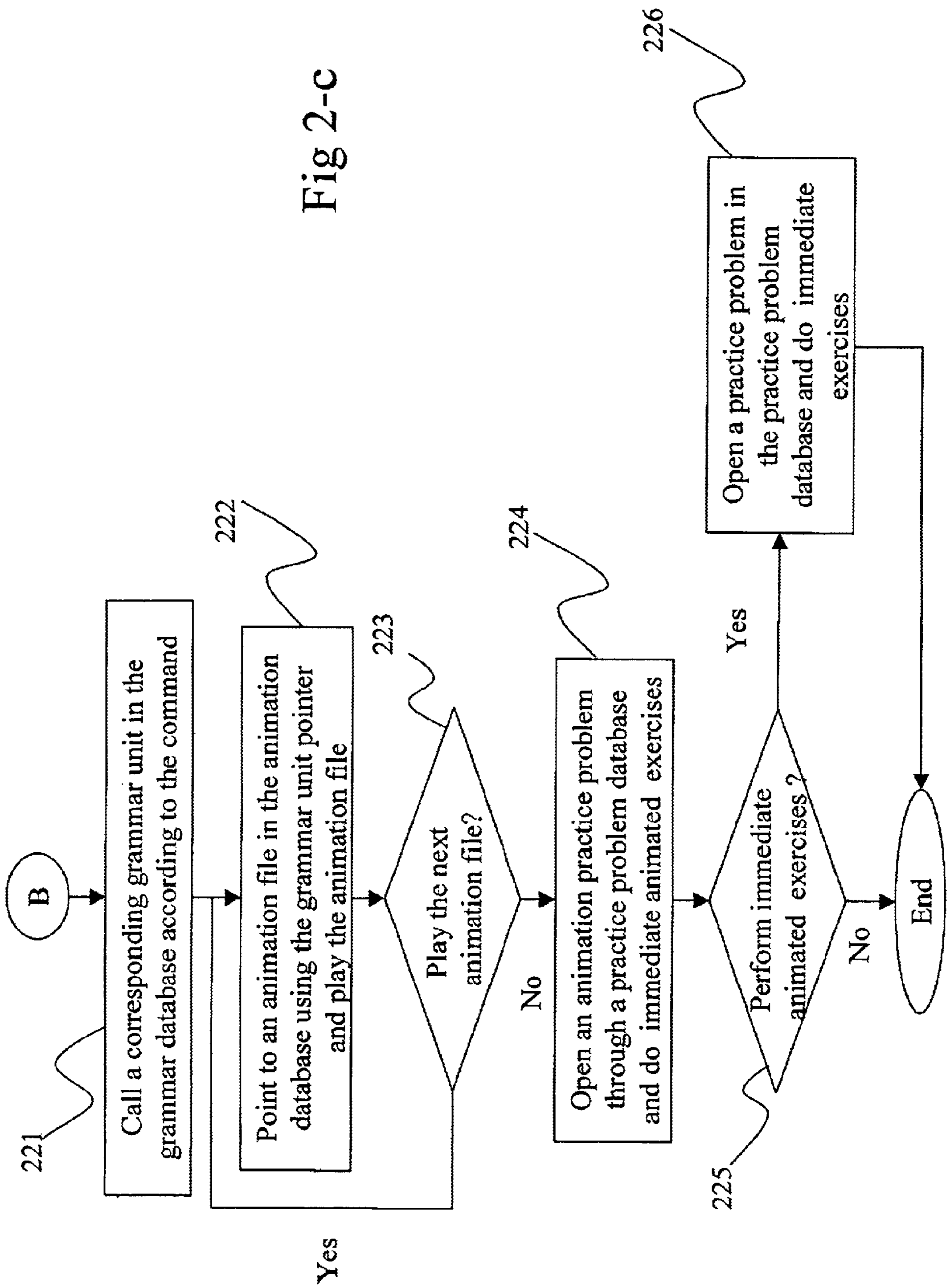
Fig 2-c

STORY INTERACTIVE GRAMMAR TEACHING SYSTEM AND METHOD

BACKGROUND OF THE INVENTION

1. Field of the Invention

The invention relates to a computer-aided language learning system and, in particular, to a story interactive grammar teaching system and method that teaches grammar rules through interaction with learners 2. Related Art Learning a new language is often a difficult task and heavy burden for most people. One is hardly able to master a language without studying hard. Many people cannot comprehend or speak a language (such as English) even after years of learning. Some other people are good at listening and understanding people's words but make mistakes in writing or tests. The later suffer mainly from bad grammar basis. The invention aims to solve these problems.

One is not able to form a correct sentence, not to mention writing articles or taking tests, without fully understanding grammar rules, even if he or she can remember a lot of vocabulary and pronounce correctly. However, once a learner knows the correct grammar rules, he or she can use a finite number of words to form all sorts of sentences, composing grammatically correct articles, without any difficulty. Even though everybody knows the importance of grammar, conventional teaching methods are insufficient to allow students to learn correctly from teachers. In the end, grammar classes are filled with many boring rules for students to memorize and to practice. As a result, most people start to dislike grammar classes, though they still have to take them.

Various computer and Internet based grammar learning tools or methods available on the market cannot aviod "stating rules, giving examples, and practicing problems". The results are not different from conventional classes and textbooks. Whether a sentence is grammatically correct and whether words are appropriately used should be judged and corrected immediately so learners do not continue making the same mistakes. However, conventional teaching methods, textbooks, currently available computer applications, and Internet based grammar learning tools cannot achieve such a goal.

Given the various drawbacks in conventional foreign language grammar teaching methods, it is highly desirable to provide a simple and convenient computer-aided language learning system to solve such problems. Mature computer technologies are employed to overcome shortcomings such as limited training materials, insufficient interactions and inadequate instructions in conventional foreign language grammar teaching methods and, at the same time, to effectively increase a learner's ability to in express his or her ideas.

SUMMARY OF THE INVENTION

In light of the above-mentioned problems, the invention provides a grammar teaching method and system that embeds grammatical rules into animations, providing abstract rules with concrete expression in stories to increase the learner's memory. Since the animation describes some story, learners can readily master grammatical rules through this form of entertainment. The animation also contains interactive practices and quizzes for learners to fully understand and memorize the contents. During the process of watching the animation and doing the exercises, the learner can refer to detailed grammar rules and example sentences at any time. This method is ideal for any person to learn any foreign language.

The invention includes the steps of: establishing an animation database and at least one animation file, receiving a command input from a user, and executing the command using the interactive grammar teaching system.

BRIEF DESCRIPTION OF THE DRAWINGS

The present invention will become more fully understood from the detailed description given hereinbelow illustration only, and thus are not limitative of the present invention, and wherein:

FIG. 1-*a* shows a system structure of the disclosed story interactive grammar teaching system;

FIG. 1-*b* shows a system structure of the animation database in FIG. 1-*a;*

FIG. 1-*c* shows a system structure of the grammar database in FIG. 1-*a;*

FIG. 1-*d* shows a system structure of the script database in FIG. 1-*a;*

FIG. 1-*e* shows a system structure of the practice problem database in FIG. 1-*a;*

FIG. 1-*f* shows a system structure of the multimedia database in FIG. 1-*a;*

FIG. 2-*a* shows a flowchart of the disclosed story interactive grammar teaching method;

FIG. 2-*b* shows a flowchart of another part of the disclosed story interactive grammar teaching method;

FIG. 2-*c* shows a flowchart of yet another part of the disclosed story interactive grammar teaching method;

DETAILED DESCRIPTION OF THE INVENTION

A story interactive grammar teaching system and method are disclosed to provide a simple and intuitive computer-aided language grammar learning system to solve problems existing in conventional grammar instruction. A user can enhance his or her grammar knowledge by simply following hints from the system and answering questions given by the computer.

We will use a preferred embodiment to illustrate the feasibility of the invention. As shown in FIG. 1, the interactive grammar teaching system 100 is used to process all grammar teaching tasks. The system 100 contains (1) an animation database 110 and (2) a central control module 160.

(1) The animation database 110 stores at least one animation file that is linked to other files. When a user enters the system, a monitor signal is sent to the central control module 160. The animation database further contains (a) a grammar database 120, (b) a script database 130, (c) a practice problem database 140, and (d) a multimedia database 150.

(a) The grammar database 120 stores at least one grammar file and a plurality of fields for interlinks. With reference to FIG. 1-*c*, the grammar database 120 also provides a grammar database structure table 125 that contains:

- a grammar chapter, which provides two fields for a grammar chapter number and a grammar chapter title;
- a grammar unit, which provides two fields for a grammar unit number and a grammar unit title;
- a grammar rule, which provides three fields for a grammar rule number, a grammar rule, and a grammar rule address; and a grammar example sentence, which provides three fields for a grammar example sentence number, grammar example sentence content, and a grammar example sentence address.

The grammar database structure table 120 performs pointer linking according to the order of the grammar chapters, the grammar units, the grammar rule contents, and the grammar example sentences.

(b) The script database 130 stores at least one script file and a plurality of fields for interlinks. With reference to FIG. 1-*d*, the script database 130 also provides a script database structure table 135 that contains:

a grammar unit, which provides two fields for a grammar unit number and a grammar unit title;

a script serial number, which provides two fields for a script number and a script title; and script content, providing two fields for a story number and a story title.

The script database structure table 135 performs pointer linking according to the order of the grammar units, the script serial numbers, and the script contents.

(c) The practice problem database 140 stores at least one practice problem file and a plurality of fields for interlinks. With reference to FIG. 1-*e*, the practice problem database 140 also provides a practice problem database structure table 145 that contains:

a grammar unit, which provides two fields for a grammar unit number and a grammar unit title;

an animation practice problem, which provides five fields for an animation practice problem number, animation practice problem content, an animation practice problem address, animation practice problem solution content, and an animation practice problem solution address; and a test problem, which provides five fields for a test problem number, test problem content, a test problem address, test problem solution content and a test problem solution address.

The practice problem database structure table 145 performs pointer linking according to the order of the grammar units, the animation practice problems, the animation practice problem solutions, the grammar units, the test problems, and the test problem solutions.

(d) The multimedia database 150 stores at least one multimedia file and a plurality of fields for interlinks. With reference to FIG. 1-*f*, the multimedia database 150 also provides a multimedia database structure table 155 that contains:

a grammar unit, which provides two fields for a grammar unit number and a grammar unit title;

a picture file, which provides five fields for a picture file number and a picture file address;

a sound file, which provides two fields for a sound file number and a sound file address; and a text file, which provides two fields for a text file number and a text file address.

The multimedia database structure table 155 performs pointer linking according to the order of the grammar units, the picture file numbers, the picture file addresses, the grammar units, the sound file numbers, the sound file addresses, the grammar units, the text file numbers, and the text file addresses.

(2) The central control module 160 receives and processes all commands to access all files in the animation database

110. When the monitoring signal is received, the central control module 160 monitors the whole process and accesses the corresponding files from a specific database according to the monitoring signal.

As shown in FIG. 1-*b*, the animation database 110 also provides an animation database structure table 112 that has grammar units, animation files, and animation practice problems. The animation file tree diagram in the drawing explains the structure of the whole animation database 110. The next level of the animation file has animation objects and animation contents. The level below the animation object contains a set of animation files, a set of sound files, and a set of text files. The level below the animation contents contains a set of rule contents, a set of example sentences, a set of relevant practice problems and corresponding solutions, and a story. One thus sees that the animation database 110 is composed of a plurality of sets of animation files that are arranged and connected in levels.

The interactive grammar teaching system 100 can be run on any computer executable hardware platform. The computer executable hardware platform can be a PC (Personal Computer), an NB (Notebook), a PDA (Personal Digital Assistant), or a mobile phone. Any person skilled in the art can make all sorts of equivalent modifications to implement the disclosed interactive grammar teaching system 100 in any electronic device and those connected to a network.

As shown in FIG. 2-*a*, the disclosed story interactive grammar teaching method starts by establishing an animation database 110 and at least one animation file (step 200). The detailed steps for establishing the animation database 110 are contained in step A. The interactive grammar teaching system 100 then receives a command input from a user (step 210) and executes the command (step 220). The steps for executing the command are detailed in step B.

With reference to FIG. 2-*b*, a grammar database 120 and at least one relevant datum are established (step 201). Grammar rules are deduced and supplied with appropriate example sentences to form a grammar database 120. One the grammar database 120 is established, a script database 130 and at least one relevant datum are established (step 202). Grammar rules in a particular grammar unit are taken to create a language environment for the grammar rules, forming a story script for the animation script database 130. Afterwards, a practice problem database 140 and at least one relevant datum are established (step 203). Following the grammar rules, practice problems with corresponding solutions and practice problems with corresponding solutions for grammar tests are designed for the animations to form the practice problem database 140. A multimedia file database 150 and at least one relevant datum are established (step 204). Animated conversations, captions, explanations, and pictures along with related sound effects, graphs, and texts are made to form the multimedia file database 150. After all the databases are made, an animation file is made (step 205) and stored in the animation database 110. Finally, a central control module 160 integrates data in the above four databases and processes their linking relations (step 206), followed by step 210.

According to a script and its practice problems, animation objects are designed along with sound effects to give an animation for learning grammar. The animation and the animation practice problems form the animation database 110. Aside from helping to reinforce grammar rules, the animations are also designed to create a humorous effect, which reduces the boredom and lightens the task of learning grammar. Through the linking of the central control module 160, a complete animation teaching unit for the grammar units is formed. It includes animation learning, immediate animation exercises, immediate quizzes and immediate grammar references.

With reference to FIG. 2-*c*, a corresponding grammar unit is called from the grammar database 120 according to the command (step 221). Once the grammar unit is confirmed, the pointer of the grammar unit points to an animation file in the animation database 110 and the animation file is played (step 222). The user can perform play operations such as fast forward and rewind according to his or her needs during the process of instruction. Afterwards, step 223 determines whether a next animation file should be played. If another animation file should be played then step 222 follows; otherwise, an animation practice problem in a practice problem database 140 is opened for immediate practice (step 224). The practice can be immediately analyzed to provide solution analysis and statistics (step 225). If immediate tests are requested, a test practice problem in the practice problem database 140 is opened for immediate quizzes (step 226); otherwise, the process finishes. The immediate quizzes are automatically analyzed to provide solution analysis, scores and suggestions. The process then finishes.

In steps 224 and 226, the user can check grammar rules and example sentences at any time. The user is thus able to combine animation scenes, exercises, and grammar rules to obtain a complete understanding of the grammar unit.

After the user enters the disclosed system 100, he or she can learn grammar rules by following the hints given in the animations. The disclosed system 100 teaches grammar rules through the animation, speech and text outputs. The user can choose to play animations repeatedly to reinforce his or her memory. The user is then given practice problems and answers them according to hints provided by the system. Using this intuitive foreign language grammar learning model, the user can learn any language in the world.

What is claimed is:

1. A story interactive grammar teaching system running over a computer executable hardware platform for foreign language grammar learning, monitoring its procedure, and using a multimedia file to complete a foreign language grammar training job for a user, which system comprises:

- an animation database, which stores at least one animation file linking with other relevant file sets and sends out a monitoring signal when a user enters the system, the animation database including:
- a grammar database, which stores at least one grammar file and a plurality of fields for interlinks;
- a script database, which stores at least one script file and a plurality of fields for interlinks;
- a practice problem database, which stores at least one practice problem file and a plurality of fields for interlinks;
- a multimedia database, which stores at least one multimedia file and a plurality of fields for interlinks; and
- a central control module, which receives and processes commands, accesses files in the animation database, and, when the monitoring signal is received, accesses a file according to the received monitoring signal.

2. The system of claim 1, wherein the animation database stores an animation database structure table which includes at least a grammar unit, an animation file, and an animation practice problem.

3. The system of claim 2, wherein the animation file further includes at least an animation object and an animation content.

4. The system of claim 3, wherein the animation object further includes a set of picture files, a set of sound files, and a set of text files.

5. The system of claim 3, wherein the animation content further includes a set of rule contents and example sentences, a set of practice problems and solutions, and a story.

6. The system of claim 1, wherein the grammar database stores a grammar database structure table which includes at least:

- a grammar chapter, which provides two fields for a grammar chapter number and a grammar chapter title;
- a grammar unit, which provides two fields for a grammar unit number and a grammar unit title;
- a grammar rule, which provides three fields for a grammar rule number and a grammar rule, and a grammar rule address; and
- a grammar example sentence, which provides three fields for a grammar example sentence number, a grammar example sentence content, and a grammar example sentence address.

7. The system of claim 6, wherein the grammar database structure table in the grammar database performs pointer linking according to the order of the grammar chapters, the grammar units, the grammar rule contents, and the grammar example sentences.

8. The system of claim 1, wherein the script database stores a script database structure table which includes at least:

- a grammar unit, which provides two fields for a grammar unit number and a grammar unit title;
- a script serial number, which provides two fields for a script number and a script title; and
- a script content, providing two fields for a story number and a story title.

9. The system of claim 8, wherein the script database structure table in the script database performs pointer linking according to the order of the grammar units, the script serial numbers, and the script contents.

10. The system of claim 1, wherein the practice problem database stores a practice problem database structure table which includes at least:

- a grammar unit, which provides two fields for a grammar unit number and a grammar unit title;
- an animation practice problem, which provides five fields for an animation practice problem number, an animation practice problem content, an animation practice problem address, an animation practice problem solution content, and an animation practice problem solution address; and
- a test problem, which provides five fields for a test problem number, a test problem content, a test problem address, a test problem solution content and a test problem solution address.

11. The system of claim 10, wherein the practice problem database structure table in the practice problem database performs pointer linking according to the order of the grammar units, the animation practice problems, and the animation practice problem solutions, the grammar units, the test problems, and the test problem solutions.

12. The system of claim 1, wherein the multimedia database stores a multimedia database structure table which includes at least:

- a grammar unit, which provides two fields for a grammar unit number and a grammar unit title;

a picture file, which provides five fields for a picture file number and a picture file address;

a sound file, which provides two fields for a sound file number and a sound file address; and a text file, which provides two fields for a text file number and a text file address.

13. The system of claim 12, wherein the multimedia database structure table in the multimedia database performs pointer linking according to the order of the grammar units, the picture file numbers, the picture file addresses, the grammar units, the sound file numbers, the sound file addresses, the grammar units, the text file numbers, and the text file addresses.

14. The system of claim 1, where in the computer executable hardware platform is selected from the group consisting of a PC (Personal Computer), an NB (Notebook), a PDA (Personal Digital Assistant), and a mobile phone.

15. The system of claim 1, wherein the system runs over an electronic platform in communications with a network.

16. A story interactive grammar teaching method running over a computer executable hardware platform for foreign language grammar learning, using an interactive grammar teaching system to monitor its procedure, and using a multimedia file to complete a foreign language grammar training job for a user, which method comprises the steps of:

establishing an animation database and at least one animation file;

receiving a command input from the user; and executing the command using the interactive grammar teaching system.

17. The method of claim 16, wherein the step of establishing an animation database and at least one animation file further includes the steps of:

establishing a grammar database and at least one relevant data;

establishing a script database and at least one relevant data;

establishing a practice problem database and at least one relevant data;

establishing a multimedia file database and at least one relevant data;

making an animation file; and integrating data in the four databases using a central control module and processing their interlinking relations.

18. The method of claim 16, wherein the step of executing the command using the interactive grammar teaching system further includes the steps of:

calling a grammar unit in the grammar database according to the command;

pointing to the animation file in the animation database using a pointer of the grammar unit and playing the animation file;

determining whether a next animation file needs to be played;

opening an animation practice problem in a practice problem database and performing immediate animation practices;

determining whether immediate practices need to be performed; and opening a test problem in a practice problem database and performing immediate tests.

19. The method of claim 16, wherein the computer executable hardware platform is selected from the group consisting of a PC (Personal Computer), an NB (Notebook), a PDA (Personal Digital Assistant), and a mobile phone.

* * * * *